(12) United States Patent
Hershkovitz et al.

(10) Patent No.: US 11,752,884 B2
(45) Date of Patent: Sep. 12, 2023

(54) METHOD AND SYSTEM FOR OPERATING AN ELECTRIC VEHICLE IN OFF-ROAD CONDITIONS

(71) Applicant: GM GLOBAL TECHNOLOGY OPERATIONS LLC, Detroit, MI (US)

(72) Inventors: Barak Hershkovitz, Even Yehuda (IL); Ravid Erez, Hod-Hashron (IL); Ariel Telpaz, Givat Haim Meuhad (IL); Nadav Baron, Herzliya (IL); Shani Avnet, Tel Aviv (IL); Michael R. Colville, Fenton, MI (US); Yuval Gilboa, Pardesiya (IL); Oleg Karp, Rishon-LeTsyon (IL); Benjamin Perahya, Tel Aviv (IL)

(73) Assignee: GM Global Technology Operations LLC, Detroit, MI (US)

(*) Notice: Subject to any disclaimer, the term of this patent is extended or adjusted under 35 U.S.C. 154(b) by 120 days.

(21) Appl. No.: 17/523,341

(22) Filed: Nov. 10, 2021

(65) Prior Publication Data

US 2023/0146288 A1 May 11, 2023

(51) Int. Cl.
*B60L 15/20* (2006.01)
*B60L 1/00* (2006.01)
*G01C 21/34* (2006.01)

(52) U.S. Cl.
CPC .......... *B60L 15/2045* (2013.01); *B60L 1/003* (2013.01); *G01C 21/3469* (2013.01); *B60L 2240/48* (2013.01); *B60L 2240/54* (2013.01); *B60L 2240/622* (2013.01); *B60L 2240/64* (2013.01); *B60L 2260/28* (2013.01)

(58) Field of Classification Search
CPC .. B60L 15/2045; B60L 1/003; B60L 2240/48; B60L 2240/54; B60L 2240/622; B60L 2240/64; B60L 2240/28; G01C 21/3469
See application file for complete search history.

(56) References Cited

U.S. PATENT DOCUMENTS

| | | | |
|---|---|---|---|
| 2018/0281797 A1* | 10/2018 | Berels | B60G 17/0165 |
| 2022/0379767 A1* | 12/2022 | Salter | B60L 53/16 |
| 2023/0001824 A1* | 1/2023 | Shaotran | H01M 10/486 |

* cited by examiner

Primary Examiner — Adam D Tissot
(74) Attorney, Agent, or Firm — Quinn IP Law (57) ABSTRACT

An operating system for a vehicle having an electric vehicle (EV) drivetrain and a plurality of electrically-powered accessories is described. A controller determines, via a navigation system, a target off-road trail segment, and characterizes the subject vehicle, ambient conditions, and the target off-road trail segment to determine an estimated consumption of electric energy for the vehicle to operate over the target off-road trail segment. The EV drivetrain and the electrically-powered accessories are controlled during operation of the vehicle on the off-road trail segment based upon the estimated consumption of electric energy for the subject vehicle. This is done to minimize a likelihood of a low SOC event for the DC power source for the trail segment and to avoid a low battery state at a location that is distal from a charging station.

19 Claims, 4 Drawing Sheets

METHOD AND SYSTEM FOR OPERATING AN ELECTRIC VEHICLE IN OFF-ROAD CONDITIONS

INTRODUCTION

Commercially available vehicles capable of off-road operation are being introduced with electric vehicle (EV) drivetrains. A vehicle having an EV drivetrain may be operated in off-road conditions where access to charging systems may be limited. Operating an EV on unsurfaced tracks poses new challenges in terms of electric energy consumption and management. There may be fewer charging stations in an off-road environment compared to an urban or highway environment, and a higher probability of having no mobile connectivity. Furthermore, the road conditions may require drivetrain operating characteristics that consume a substantial amount of electric energy, such as in a terrain mode. There is a risk that the electric charge on the battery of the EV may get to a low battery state at a location that is distal from a charging station, and without communication capability.

There is a need for an EV control system that can learn off-road trail characteristics based on sensor data from other vehicles that have driven on the same trail to dynamically control off-road trail navigation for efficient energy consumption. There is a need for an EV control system that can dynamically control the operation of the EV drivetrain and other on-vehicle systems in context of the off road segment for efficient energy consumption. There is a need for an EV control system that accounts for factors such as off-road driving style and ambient weather conditions. There is a need for a system that is capable of proposing on-line route changes along the trail in relation to battery charge state to manage energy to avoid a low battery state at a location that is distal from a charging station.

SUMMARY

The concepts described herein include a method and system to dynamically control a vehicle including an electric vehicle (EV) drivetrain that is operating on an off-road trail segment in a manner that achieves efficient energy consumption, and dynamically controlling the off-road trail navigation for efficient electric energy consumption.

In one embodiment, this includes an operating system for a subject vehicle that includes an electric vehicle (EV) drivetrain and a plurality of electrically-powered accessories electrically coupled to a rechargeable DC power source, a navigation system including a global navigation satellite system (GNSS) sensor, and a controller. The controller includes an instruction set in the form of an encoded datafile that is stored in a non-transitory digital data storage medium. The instruction set is executable to determine, via the navigation system, a target off-road trail segment, and characterize the subject vehicle, ambient conditions, and the target off-road trail segment to determine an estimated consumption of electric energy for the subject vehicle to operate over the target off-road trail segment. The EV drivetrain and the plurality of electrically-powered accessories are controlled during operation of the subject vehicle on the off-road trail segment based upon the estimated consumption of electric energy for the subject vehicle. This is done to minimize a likelihood of a low state of charge (SOC) event for the DC power source for the trail segment and to avoid a low battery state at a location that is distal from a charging station.

An aspect of the disclosure includes the instruction set being executable to control electric power consumption of the vehicle to avoid a low SOC event for the DC power source during operation of the subject vehicle on the target off-road trail segment.

Another aspect of the disclosure includes the operational parameters of the EV drivetrain being a transmission gear state, a locking differential state and a 2WD/4WD transfer case state. The instruction set is executable to control electric power consumption associated with at least one of the transmission gear state, the locking differential state, and the 2WD/4WD transfer case state during operation of the subject vehicle on the off-road trail segment.

Another aspect of the disclosure includes the operational parameters of the plurality of electrically-powered accessories being control parameters for at least one of an electric steering system, a HVAC system, and a stability control system. The instruction set is executable to control the plurality of electrically-powered accessories to control electric power consumption of at least one of the electric steering system, the HVAC system, and the stability control system during operation of the subject vehicle on the off-road trail segment.

Another aspect of the disclosure includes the instruction set being executable to characterize topography, terrain, surface conditions, trail grade, and accessibility for the target off-road trail segment.

Another aspect of the disclosure includes the instruction set being executable to characterize topography, terrain, surface conditions, trail grade, and accessibility for the target off-road trail segment based upon information previously communicated from other vehicles that have traversed the trail segment.

Another aspect of the disclosure includes the instruction set being executable to locate communication sites proximal to the target off-road trail segment.

Another aspect of the disclosure includes the instruction set being executable to locate electric recharging sites proximal to target off-road trail segment.

Another aspect of the disclosure includes the instruction set being executable to determine present ambient temperature, precipitation, and other factors that may affect wheel slippage of the target off-road trail segment.

Another aspect of the disclosure includes the instruction set being executable to characterize the vehicle operator, and estimate the consumption of electric energy for the subject vehicle to operate over the target off-road trail segment, wherein the estimated consumption of electric energy is determined based upon the operational parameters of the EV drivetrain and the plurality of electrically-powered accessories, the ambient conditions, the target off-road trail segment, and the characterization of the vehicle operator.

Another aspect of the disclosure includes the instruction set being executable to determine a vehicle mass, tire inflation pressures, and presence of a towed vehicle and other dynamic factors affecting power consumption.

Another aspect of the disclosure includes the instruction set being executable to control the EV drivetrain and the plurality of electrically-powered accessories during operation of the subject vehicle on the off-road trail segment based upon the estimated consumption of electric energy for the subject vehicle.

Another aspect of the disclosure includes the instruction set being executable to suggest an alternative route based upon the estimated consumption of electric energy for the subject vehicle to avoid occurrence of a low SOC event during operation of the vehicle.

Another aspect of the disclosure includes the instruction set being executable to identify and recommend a midcourse exit from the target off-road trail segment to find a charging station based upon the estimated consumption of electric energy for the subject vehicle to avoid occurrence of a low SOC event during operation of the vehicle on the target off-road trail segment.

Another aspect of the disclosure includes the instruction set being executable to recommend an alternative travel route based upon the estimated consumption of electric energy for the subject vehicle to avoid occurrence of a low SOC event during operation of the vehicle on the target off-road trail segment.

Another aspect of the disclosure includes a method for controlling operation of a subject vehicle that includes an electric vehicle (EV) drivetrain and a plurality of electrically-powered accessories electrically coupled to a rechargeable DC power source, and a navigation system including a GNSS sensor. The method includes determining, via the navigation system, a target off-road trail segment, determining operational parameters of the EV drivetrain and the plurality of electrically-powered accessories, characterizing ambient conditions for the target off-road trail segment, and characterizing the target off-road trail segment. A consumption of electric energy for the subject vehicle to operate over the target off-road trail segment is estimated, wherein an estimated consumption of electric energy is determined based upon the operational parameters of the EV drivetrain and the plurality of electrically-powered accessories, the ambient conditions, and the target off-road trail segment. The EV drivetrain and the plurality of electrically-powered accessories are controlled during operation of the subject vehicle on the target off-road trail segment based upon the estimated consumption of electric energy for the subject vehicle.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. Exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with any number of mechanical and/or electronic systems, and that the vehicle systems described herein are merely exemplary embodiment of possible implementations.

The use of ordinals such as first, second and third does not necessarily imply a ranked sense of order, but rather may only distinguish between multiple instances of an act or structure.

Figure 1:
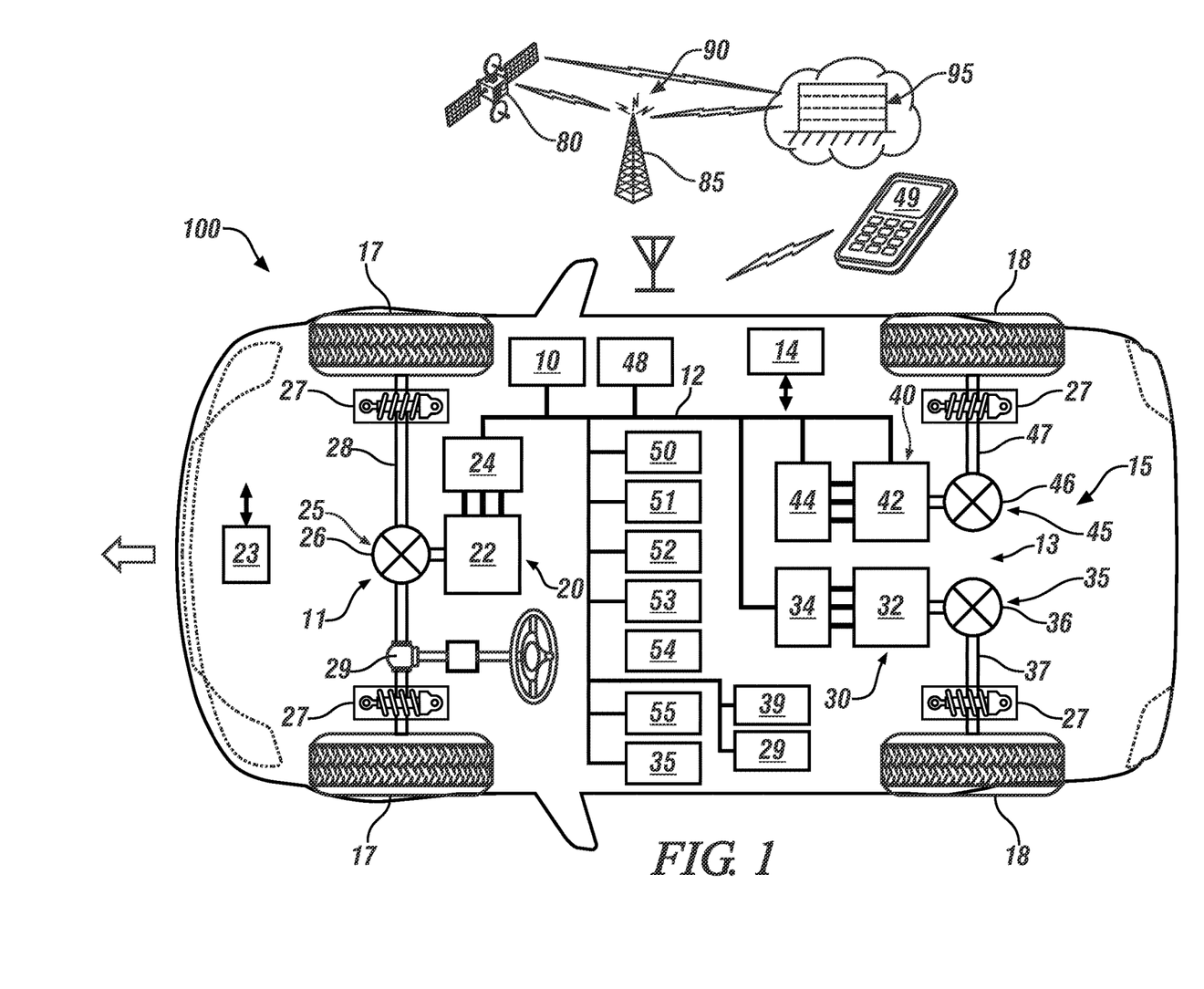
FIG. 1 schematically illustrates a subject vehicle having an electrified (EV) drivetrain, in accordance with the disclosure.

Referring to the drawings, wherein like reference numerals correspond to like or similar components throughout the several Figures, FIG. 1 schematically illustrates an embodiment of a vehicle 100 that includes an electrified vehicle (EV) drivetrain 15 that is arranged to transfer propulsion torque to one of or a plurality of wheels employing electrified drive units (hereafter "drive units") that employ electric machines as prime movers.

The EV drivetrain 15 of the vehicle 100 may be capable of two-wheel drive (2WD) operation, four-wheel drive (4WD) operation, all-wheel drive (AWD) operation, and/or another drivetrain operation within the concepts described herein.

The vehicle 100 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The EV drivetrain 15 includes, in one embodiment, a first drive unit 20, a second drive unit 30, and a third drive unit 40. A controller 14 is arranged to control operation of the EV drivetrain 15. Operation of this embodiment of the vehicle 100 including the EV drivetrain 15 is controlled as described herein.

The illustrated drive wheels are non-limiting examples, and include a first, front axle 11 having steerable front wheels 17, and a second, rear axle 13 having fixed position rear wheels 18.

The front wheels 17 are mechanically coupled to a first drive unit 20, which includes a first electric machine 22 that is coupled to the front wheels 17 via a first driveline 25 that includes, in one embodiment, a transaxle 26 and half-shafts 28. A first inverter 24 is coupled to the first electric machine 22, and is electrically connected to a rechargeable high-voltage DC power source (battery) 10 via the high-voltage bus 12. The controller 14 controls operation of the first drive unit 20 by controlling the first inverter 24. The front wheels 17 are coupled to an electric-power assisted steering system 29 in one embodiment.

The rear wheels 18 are mechanically coupled to the second drive unit 30 and the third drive unit 40 in one embodiment. The second drive unit 30 includes a second electric machine 32 that is coupled to a first of the rear wheels 18 via a second driveline 35 that includes, in one embodiment, a differential 36 and a half-shaft 37. A second inverter 34 is coupled to the second electric machine 32, and electrically connected to the battery 10 via the high-voltage bus 12. The controller 14 controls operation of the second drive unit 30 by controlling the second inverter 34. The third drive unit 40 includes a third electric machine 42 that is coupled to a second of the rear wheels 18 via a third driveline 45 that includes, in one embodiment, a differential 46 and a half-shaft 47. A third inverter 44 is coupled to the third electric machine 42, and electrically connected to the battery 10 via the high-voltage bus 12. The controller 14 controls operation of the third drive unit 40 by controlling the third inverter 44.

The battery 10 is coupled to the first, second and third drive units 20, 30, 40 via the high-voltage bus 12. In one embodiment, the battery 10 is a multi-cell lithium-ion device capable of repetitive charging and discharging under a range of conditions.

The illustrated arrangement of the EV drivetrain 15 is shown for purposes of illustration, and the arrangement of the wheels and drive units is a non-limiting embodiment. It is appreciated that the concepts described herein may also be applied to EV drivetrain configurations that include one, two, three, or four electric machines and corresponding drivelines and inverters. The concepts described herein may apply to various configurations of EV drivetrains and systems having one or multiple electric drive units that are capable of operating to transfer propulsion torque to the front wheels 17 and the rear wheels 18 employing electric power as the power source.

The vehicle 100 includes an electrically-powered steering system 29 for controlling the steerable wheels, e.g., front wheels 17.

The EV drivetrain 15 may include one or more of a transmission, a locking differential and a 2WD/4WD transfer case, with an electrically-powered hydraulic pump. Operation of the EV drivetrain 15 includes controlling one or more of a transmission gear state, a locking differential state and a 2WD/4WD transfer case state.

The vehicle 100 has a climate control system 29 that includes an electrically-powered heating-ventilation-air-conditioning (HVAC) compressor and fan system.

The vehicle 100 includes an electrically-powered stability control system 23 that includes controllable suspension actuators 27 arranged at the corners of the vehicle 100. Vehicle parameters may be determined from sensor measurements, estimates, and perceptions received by a sensor system in the form of an inertial measurement unit (IMU) 51, which communicates with the stability control system 23. Non-limiting examples of vehicle parameters include longitudinal acceleration, lateral acceleration, yaw rate, steering wheel angle, individual wheel speeds, longitudinal velocity, lateral velocity, tire forces (lateral, normal), vehicle mass, road surface coefficient, upcoming road curvature, and/or upcoming road obstacles. The vehicle stability control system 23 controls the suspension actuators 27 arranged at each of the corners of the vehicle 100 in a manner that maintains vehicle stability on road and during off-road excursions.

The vehicle 100 has a telematics device 48, which includes a wireless telematics communication system capable of extra-vehicle communications, including communicating with a communication network system having wireless and wired communication capabilities. The telematics device 48 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively, or in addition, the telematics device 48 has a wireless telematics communication system capable of short-range wireless communication to the handheld device 49, e.g., a cell phone, a satellite phone or another telephonic device. In one embodiment the handheld device 49 is loaded with a software application that includes a wireless protocol to communicate with the telematics device 48 to effect identification of the vehicle operator. In one embodiment, the handheld device 49 executes the extra-vehicle communication, including communicating with an off-board server 95 via a communication network 90 including a satellite 80, an antenna 85, and/or another communication mode. Alternatively, or in addition, the telematics device 48 executes the extra-vehicle communication directly by communicating with the off-board server 95 via the communication network 90. In one embodiment, the off-board server 95 is cloud-based.

The vehicle 100 has a navigation system 55 that includes a computer-readable storage device or media (memory) that includes a digitized roadway map, a global navigation satellite system (GNSS) sensor 53, and a human/machine interface (HMI) device for interacting with and operating the navigation system 55. The GNSS sensor 53 generates a set of parameters corresponding to vehicle velocity, geospatial position, and vehicle heading.

The concepts described herein may be employed on various systems that may benefit from information determined from an embodiment of a spatial monitoring system 41 in a manner that is described herein.

The vehicle 100 has a first plurality of sensors 50, which includes sensors that are arranged to dynamically monitor on-vehicle operating conditions, including, e.g., vehicle speed, acceleration, braking, steering angle, yaw rate, tire pressures, vehicle mass, presence of a trailer, battery state of charge (SOC), operator requests, etc. The first plurality of sensors 50 includes the GNSS sensor 53 and the inertial measurement unit (IMU) 51. The IMU 51 is an electronic device that employs one or more of a combination of accelerometers, gyroscopes, and magnetometers that are arranged to measure and report vehicle dynamics parameters such as specific force, angular rate, yaw, and orientation of the vehicle 100.

The vehicle 100 has a second plurality of sensors 52, which includes sensors that are arranged to dynamically monitor ambient environmental conditions including, e.g., elevation, ambient pressure, ambient temperature, humidity (dew point), precipitation, time-of-day, solar load, etc. Alternatively, or in addition, a portion of the ambient environmental conditions may be obtained by connectivity to a proximal weather station or other vehicles employing using V2X communications via the telematics system 60.

The vehicle 100 has a third plurality of sensors 54 associated with the spatial monitoring system 41 that are arranged to provide spatial monitoring proximal to the subject vehicle 100. The spatial monitoring system 41 may be an element of an advanced driver assistance system (ADAS) 39. The third plurality of sensors 54 may include, e.g., a camera, a radar sensor, a lidar sensor, etc. Parameters associated with spatial monitoring include presence and location of other proximal vehicles, presence and location of stationary objects that may serve as obstructions (e.g., rocks, trees, fences, guard rails, etc.), presence and locations of pedestrians, bicyclists, animals, etc.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of digital data storage mediums including memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process.

As used herein, the terms 'dynamic', 'dynamically' and related terms describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
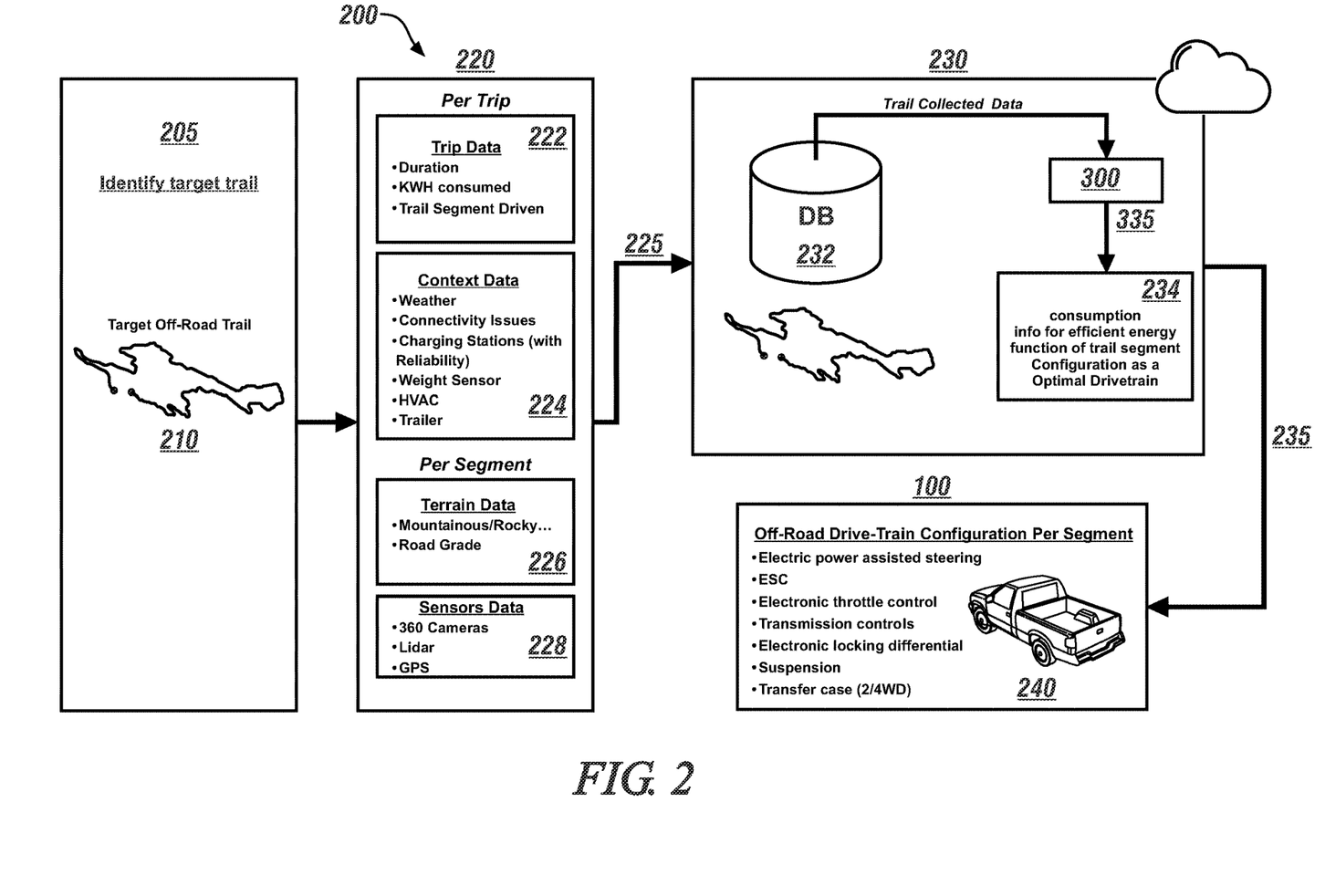
FIG. 2 schematically illustrates a process for operating an embodiment of the subject vehicle on a target off-road trail, in accordance with the disclosure.

FIG. 2 schematically illustrates a process 200 for operating an embodiment of the subject vehicle 100 described with reference to FIG. 1 on a target off-road trail 210. The process 200 includes dynamically controlling the EV drivetrain 15 and the plurality of electrically-powered accessories to minimize or optimize the consumption of electric energy by the subject vehicle 100 while operating on the target off-road trail 210. The target off-road trail 210 may be composed of one or a plurality of trail segments 212, 213, 214, et seq. Non-limiting examples of the target off-road trail 210 and the plurality of trail segments 212, 213, 214, et seq. are pictorially illustrated and described with reference to FIG. 4.

The process 200 includes identifying the target off-road trail 210 (Step 205); characterizing the target off-road trail 210 (Step 220); capturing and evaluating one or multiple characterizations of the target off-road trail 210 to determine optimal control states for the EV drivetrain 15 and the plurality of electrically-powered accessories of the subject vehicle 100 (Steps 230, 235) based upon energy consumption; and dynamically controlling operation of the EV drivetrain 15 and the plurality of electrically-powered accessories as the subject vehicle 100 traverses the plurality of trail segments 212, 213, 214, et seq., of the target off-road trail 210 in a manner that optimizes the consumption of electric energy by the subject vehicle 100 (Step 240).

The process 200 for operating the subject vehicle 100 to dynamically control the EV drivetrain 15 and the plurality of electrically-powered accessories includes identifying the target off-road trail 210 (Step 205) is based upon characterizations of the target off-road trail 210 (Step 220).

The process 200 may be implemented through a computer algorithm, machine executable code, non-transitory computer-readable medium, or software instructions programmed into a suitable programmable logic device(s) of the subject vehicle 100, such as the controller 14, the off-board server 95 in communication with the controller 14, a mobile device communicating with the controller 14 and/or the off-board server 95, another controller in the subject vehicle 100, or a combination thereof. Although the various steps shown in the flowchart diagram appear to occur in a chronological sequence, at least some of the steps may occur in a different order, and some steps may be performed concurrently or not at all.

In operation, the controller 14 identifies or otherwise determines the target off-road trail 210 including the plurality of trail segments 212, 213, 214, et seq. (Step 205). The target off-road trail 210 may be identified when the operator directs the subject vehicle 100 onto the target off-road trail 210, or when the operator enters the target off-road trail 210 into the on-board navigation system 55, or by another mechanism.

Information is gathered that is related to operation of the subject vehicle 100 on the target off-road trail 210 for each of the plurality of trail segments 212, 213, 214, et seq. (Step 220). The gathered information includes that which is related to or affecting an estimated consumption of electric energy for the subject vehicle 100 while traversing the target off-road trail 210.

The information gathering process (step 220) includes gathering trip data (Step 222), gathering context data associated with vehicle operation on the target off-road trail 210 (Step 224), gathering terrain data for the plurality of trail segments 212, 213, 214, et seq. of the target off-road trail 210 (Step 226), and gathering on-vehicle sensor data for the plurality of trail segments 212, 213, 214, et seq. of the target off-road trail 210 (Step 228). The steps of the information gathering process (step 220) are executed periodically, e.g., once per second, to gather data for storage, analysis and transmission.

The trip data (Step 222) includes travel distance, elapsed time, and electric power consumption (kW-h) for each of plurality of trail segments 212, 213, 214, et seq. of the target off-road trail 210. The trip data is gathered each time the subject vehicle 100 traverses the target off-road trail 210, and each time another connected vehicle traverses the target off-road trail 210.

The context data associated with vehicle operation on the target off-road trail 210 (Step 224) includes ambient weather conditions, e.g., precipitation, temperature, snow depth, ice, standing water, etc., and other factors affecting vehicle traction and vehicle energy that is expended to traverse the target off-road trail 210. The context data also includes vehicle information such as vehicle mass, HVAC load, presence of a trailer, and other factors affecting vehicle energy that is expended to traverse the target off-road trail 210. The context data also includes wireless connectivity for communication, and location of and accessibility to proximal charging stations in relation to the target off-road trail 210.

The terrain data for the plurality of trail segments 212, 213, 214, et seq. of the target off-road trail 210 (Step 226) includes data related to topography, terrain, surface conditions, trail grade, and other factors that may affect an estimated consumption of electric energy for the subject vehicle 100 while traversing the target off-road trail 210.

The sensor data for the plurality of trail segments 212, 213, 214, et seq. of the target off-road trail 210 (Step 228) includes data captured from the third plurality of sensors 54 that detect presence and location of other proximal vehicles, presence and location of stationary objects that may serve as obstructions (e.g., rocks, trees, fences, guard rails, etc.), presence and locations of pedestrians, bicyclists, animals, etc.

The information including the trip data, context data, terrain data, and sensor data for the target off-road trail 210 that is gathered during each trip by the information gathering process (Step 220) is communicated via the communication network 90 to a database 232, which may be arranged at the off-board server 95 (Step 225).

The information including the trip data, context data, terrain data, and sensor data for the target off-road trail 210 is employed to characterize the target off-road trail 210, as described with reference to FIG. 3.

Figure 3:
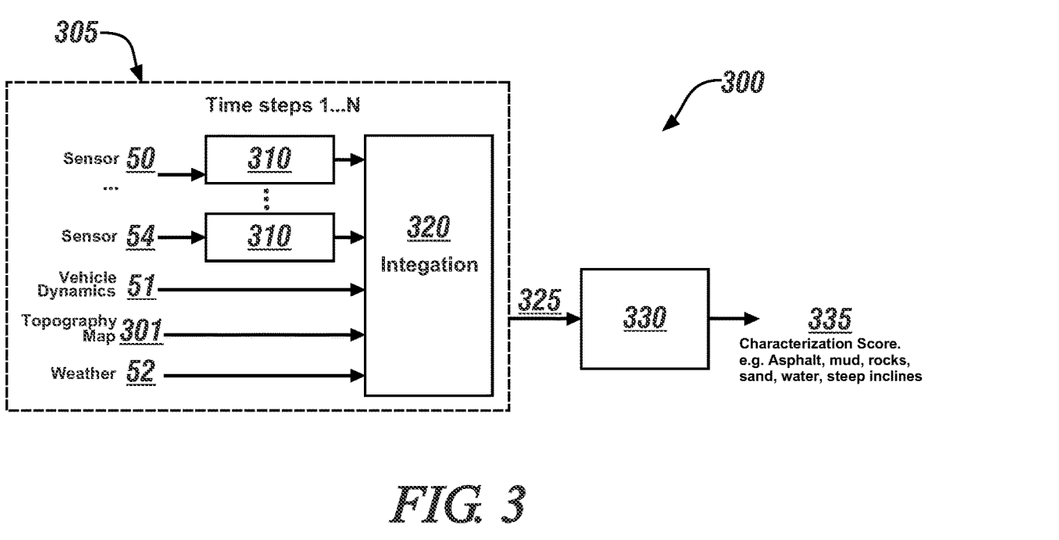
FIG. 3 schematically illustrates an off-road trail characterization process that may be employed to characterize an off-road trail employing information from a topographical map and vehicle-specific information that is gathered by one or a plurality of vehicles that have traversed the off-road trail, in accordance with the disclosure.

FIG. 3 schematically illustrates an off-road trail characterization process 300 that may be employed to characterize an off-road trail employing information from a topographical map and vehicle-specific information that is gathered by one or a plurality of vehicles that have traversed the off-road trail. The off-road trail characterization process 300 is described with reference to an embodiment of the subject vehicle 100 that is described with reference to FIG. 1 and the target off-road trail 210 that is described with reference to FIGS. 2 and 4. The information including the trip data, context data, terrain data, and sensor data for the target off-road trail 210 are acquired via the first plurality of sensors 50 that are arranged to dynamically monitor on-vehicle operating conditions, the second plurality of sensors 52 that are arranged to dynamically monitor ambient environmental conditions, and the third plurality of sensors 54 that are arranged to provide spatial monitoring proximal to the subject vehicle 100.

The off-road trail characterization process 300 executes end-to-end training to characterize the off-road segment to train the full system end-to-end, using consecutive frames of all available data. Each sensor frame, from all available sensors, goes through a convolutional neural network (CNN) 305 as a feature extraction backbone (e.g., Resnet) and the model 330 uses a recurrent neural network (RNN) to consider temporal information.

The inputs to the off-road trail characterization process 300 include inputs from each of the first plurality of sensors 50 and each of the third plurality of sensors 54, and corresponding locations from the GNSS sensor 53. The inputs also include a topographical map 301, vehicle dynamic information from the IMU 51, and ambient weather conditions derived from the second plurality of sensors 52. The inputs from each of the first plurality of sensors 50 and each of the third plurality of sensors 54 are individually passed through a convolutional neural network (CNN) 305 as feature extraction backbone (e.g., Resnet) for each time step.

The aforementioned inputs are subjected to an integration process 320 to determine an integral 325. The integral 325 is subjected to a recurrent neural network (RNN) (Step 330) to consider temporal information, thus resulting in a characterization score 335 for the target off-road trail 210. The characterization score 335 for the target off-road trail 210 represents energy consumption for each datapoint on the target off-road trail 210. This information may be employed to find a drivetrain configuration that minimizes energy consumption based upon the segment characterization. This can be achieved using regression (predicting continuous variable) methods, e.g., a decision tree for regression, a linear regression, a random forest for regression, a neural network, etc. The input data includes details of the drivetrain configuration, e.g., as described with reference to FIG. 1. The output is the energy consumption. The values (weights) in the model are the parameters that should be assigned to the drivetrain elements.

Referring again to FIG. 2, the characterization score 335 for the target off-road trail 210 is input to an optimization routine 234, which determines an optimal drivetrain configuration (Step 235) for each trail segment to achieve efficient energy consumption. The optimal drivetrain configuration determined by Step 235 for each trail segment is communicated to the subject vehicle 100.

The subject vehicle 100 employs the optimal drivetrain configuration (Step 235) for each trail segment to achieve efficient energy consumption to determine optimal control states for the EV drivetrain 15 and the plurality of electrically-powered accessories of the subject vehicle 100. The optimal drivetrain configuration (Step 235) is communicated to the subject vehicle 100, which dynamically controls operation of the EV drivetrain 15 and the plurality of electrically-powered accessories while traversing the plurality of trail segments 212, 213, 214, et seq. of the target off-road trail 210 in a manner that optimizes the consumption of electric energy (Step 240). Elements of this operation are described in additional detail with reference to FIG. 5.

Figure 4:
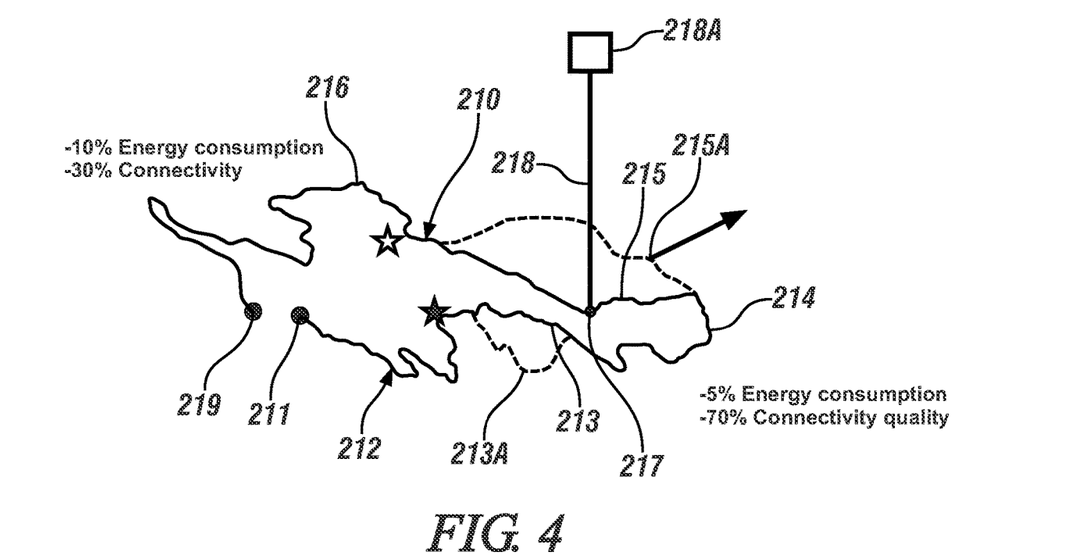
FIG. 4 pictorially shows a map of an example target off-road trail including a starting point, a plurality of trail segments, alternative trail segments, and an ending point, in accordance with the disclosure.

FIG. 4 pictorially shows a map of an example target off-road trail 210 including a starting point 211, a plurality of trail segments 212, 213, 214, 215, and 216, alternative trail segments 213A and 215A, and an ending point 219. An ejection point 217 including an ejection trail segment 218 leading to a charging station 218A is also indicated. The target off-road trail 210 may be included in the topography map 301 described with reference to FIG. 3.

The alternative trail segments 213A and 215A are alternative trails that are available along the off-road trail 210 that offer lower or more efficient energy consumption when needed. Based on the battery SOC and predicted power consumption, the vehicle controller 14 may suggest operation on one of alternative trail segments, e.g., alternative trail segments 213A and 215A, during the off-road trailing, which may be sub-optimal in terms of connectivity and sight-seeing but will change the drivetrain configuration to reduce the energy consumption so that the available battery power will be sufficient for traversing the off-road trail 210 from the starting point 211 to the end point 219.

Figure 5:
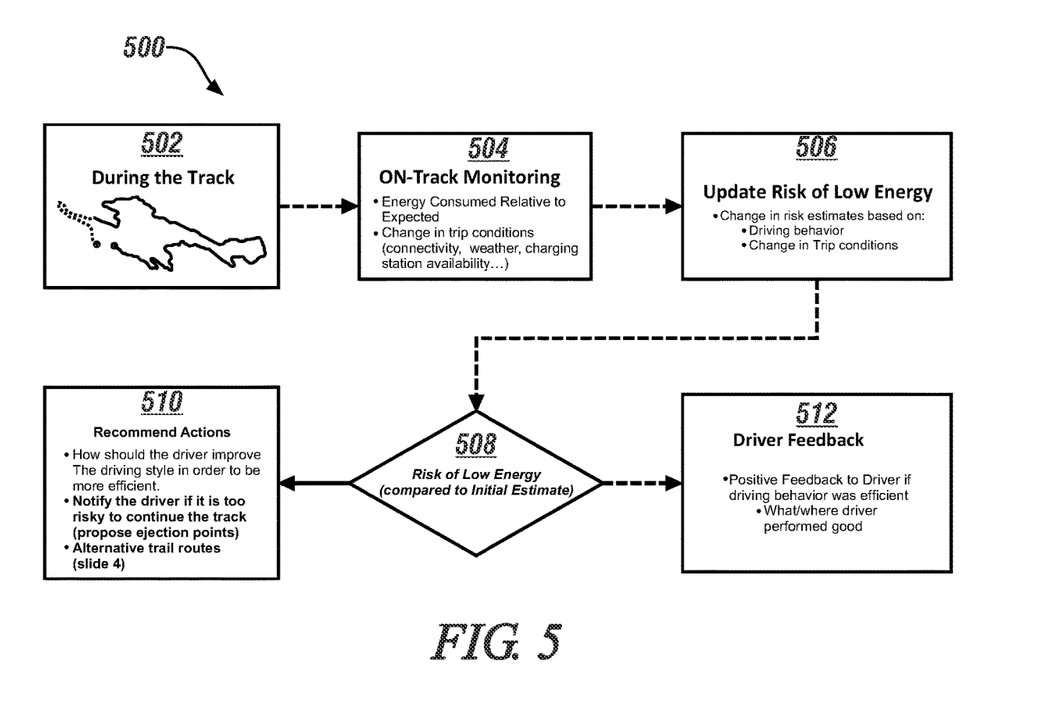
FIG. 5 schematically illustrates a process for dynamically controlling operation of a vehicle including an EV drivetrain and a plurality of electrically-powered accessories while traversing a plurality of trail segments of a target off-road trail in accordance with the disclosure.

FIG. 5 schematically illustrates a process 500 for dynamically controlling operation of the EV drivetrain 15 and the plurality of electrically-powered accessories as the subject vehicle 100 traverses the plurality of trail segments 212, 213, 214, et seq. of the target off-road trail 210. During operation of the subject vehicle 100 on the target off-road trail 210 (502), on-trail monitoring is executed (504) to determine actual energy consumption by the subject vehicle 100. The actual energy consumption by the subject vehicle 100 is compared to an expected energy consumption by the subject vehicle 100 for the trail segments 212, 213, 214, et seq. of the target off-road trail 210. The actual energy consumption by the subject vehicle 100 for one or more of the trail segments 212, 213, 214, et seq. of the target off-road trail 210 may vary from the expected energy consumption by the subject vehicle 100 due to changes in ambient weather conditions, operator behavior, and other factors.

A low energy risk assessment is updated (506) based upon the actual energy consumption by the subject vehicle 100 for the respective trail segment and the expected energy consumption by the subject vehicle 100 due to changes in ambient weather conditions, operator behavior, and other factors, and compared to an initial low energy risk assessment that was determined prior to the actual operation of the subject vehicle 100 on the target off-road trail 210 (508).

When the updated low energy risk assessment is greater than the initial low energy risk assessment (510), it indicates an increased likelihood that the subject vehicle 100 will experience a low energy event on-trail in the form of a low SOC event for the battery 10, posing an increased risk to the vehicle operator. In this case, recommendations may be generated and submitted to the vehicle operator to reduce the risk of a low energy event on-trail, including recommending changes to operator driving behavior (less aggressive), recommending alternative trail routes, e.g., alternative trail segments 213A and 215A described with reference to FIG. 4, and/or recommending changing to ejection points, e.g., recommending the ejection point 217 including an ejection trail segment 218 leading to a charging station 218A described with reference to FIG. 4. In this manner, alternative trails along the route may be suggested for more efficient energy consumption when needed based on the battery SOC and predicted energy consumption. The off-road trailing may be sub-optimal in terms of connectivity and sight-seeing but will reduce the energy consumption, based on changes in the drivetrain configuration, and will ensure that there will be sufficient energy to operate the vehicle 100 over the entire trail. If there is larger energy consumption than expected, which increases the risk of having a low SOC event for the battery 10, the system can propose ejection points along to route to charge the vehicle. If the vehicle is near these ejection points, the operator can drive to a charging location that should be within a reasonable distance and then select whether to return to the trail. Risk of a low SOC event for the battery 10 due to energy consumption in the off-road region may be amplified by factors such as absence of nearby charging stations, bad connectivity, i.e., there is no one to call if towing services are needed, muddy surface due to weather, etc. An acceptable low battery boundary state may be determined by the user in some instances, and limited by absolute levels for a low battery boundary state that are associated with causing irreversible harm to the battery 10.

When the updated low energy risk assessment is less than the initial low energy risk assessment (512), it indicates a decreased likelihood that the subject vehicle 100 will experience a low SOC event for the battery 10 on-trail. This information may be provided as feedback to the vehicle operator.

Figure 6:
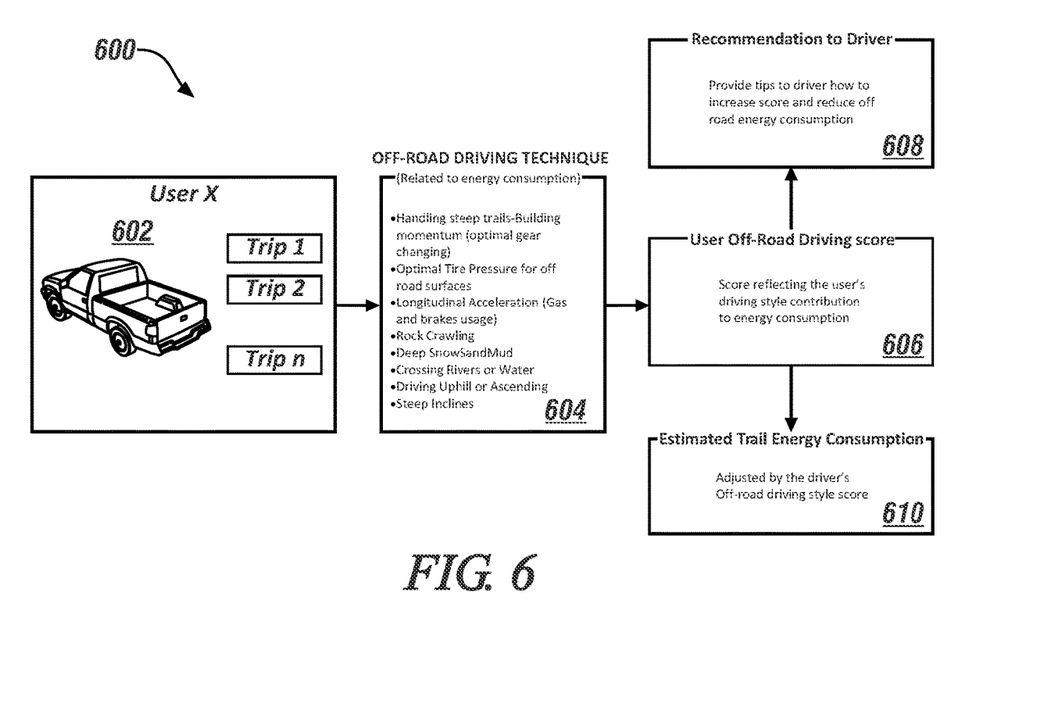
FIG. 6 schematically illustrates a process for assessing and characterizing operator behavior in context of energy consumption in an off-road environment in accordance with the disclosure.

FIG. 6 schematically illustrates a process 600 for assessing and characterizing operator behavior in context of energy consumption in an off-road environment. The process 600 includes capturing operator behavior for an identified operator when operating on multiple trips in off-road conditions in the subject vehicle 100 (602). The captured operator behavior includes off-road driving techniques related to handling various conditions such as inclines/declines, rock crawling, snow, sand, mud, rivers/streams, etc., wherein the monitored operator behavior includes inputs to the acceleration pedal, the brake pedal, gear selection, drivetrain selection, steering commands, etc. (604). The characterization process generates a driving score (606), which reflects how much the operator behavior contributes to energy consumption. By way of non-limiting examples, a positive score may reflect operator behavior that reduces energy consumption compared to an expected energy consumption for a typical off-road trail, with an increase in the magnitude of the positive score reflecting a greater reduction in energy consumption due to operator behavior. In like manner, a negative score may reflect operator behavior that increases energy consumption compared to an expected energy consumption for a typical off-road trail, with an increase in the magnitude of the negative score reflecting a greater increase in energy consumption due to operator behavior. Providing a score for off-road driving quality related to energy consumption can be achieved with regression methods. This features ranking of the model inputs, and understanding which off-road driving technique elements contribute more to the energy consumption. This is for providing feedback and tips to the driver for how to improve energy consumption.

The driving score generated by Step 606 may be employed to adjust estimated trail energy consumption during subsequent operation by the operator when operating on an off-road trail (610).

The driving score generated by Step 606 may also be employed to generate and make recommendations to the operator on driving techniques that may be employed to reduce energy consumption and improve operating efficiency (608). This includes developing an understanding of which off-road driving technique elements contribute more to the energy consumption. This is for providing feedback and tips to the driver for how to improve the energy consumption.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which has one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An operating system for a subject vehicle, the operating system comprising:
    an electric vehicle (EV) drivetrain and a plurality of electrically-powered accessories electrically coupled to a rechargeable DC power source;
    a navigation system that includes a first plurality of sensors including a global navigation satellite system (GNSS) sensor and an inertial measurement unit (IMU);
    a second plurality of sensors configured to dynamically monitor ambient environmental conditions for the subject vehicle;
    a spatial monitoring system that includes a third plurality of sensors including at least one of a camera, a radar sensor, and a lidar sensor; and
    a controller, including an instruction set stored as an encoded datafile in a non-transitory digital data storage medium, the instruction set being executable to:
        determine, via the navigation system, a target off-road trail segment;
        determine operational parameters of the EV drivetrain and the plurality of electrically-powered accessories;
        characterize, via the second plurality of sensors and the spatial monitoring system, the ambient environmental conditions for the target off-road trail segment;
        characterize the target off-road trail segment;
        characterize, via the IMU, a behavior of the vehicle operator to generate a driving score;
        estimate a consumption of electric energy for the subject vehicle to operate over the target off-road trail segment, wherein an estimated consumption of electric energy is determined based upon the operational parameters of the EV drivetrain and the plurality of electrically-powered accessories, the ambient environmental conditions, the target off-road trail segment, and the driving score;
        provide to the vehicle operator based on the driving score a recommendation to minimize consumption of electric energy for the subject vehicle; and
        control the EV drivetrain and the plurality of electrically-powered accessories during operation of the subject vehicle on the target off-road trail segment based upon the estimated consumption of electric energy for the subject vehicle.

2. The operating system of claim 1, wherein the instruction set being executable to control the EV drivetrain comprises the instruction set being executable to control electric power consumption of the subject vehicle to avoid a low state of charge (SOC) event for the DC power source during operation of the subject vehicle on the target off-road trail segment.

3. The operating system of claim 1, wherein the operational parameters of the EV drivetrain include a transmission gear state, a locking differential state and a 2WD/4WD transfer case state; and wherein the instruction set being executable to control the EV drivetrain comprises the instruction set being executable to control electric power consumption associated with at least one of the transmission gear state, the locking differential state, and the 2WD/4WD transfer case state during operation of the subject vehicle on the target off-road trail segment.

4. The operating system of claim 1, wherein the operational parameters of the plurality of electrically-powered accessories comprises control parameters for at least one of an electric steering system, a HVAC system, and a stability control system; and wherein the instruction set is executable to control electric power consumption of at least one of the electric steering system, the HVAC system, and the stability control system during operation of the subject vehicle on the target off-road trail segment.

5. The operating system of claim 1, wherein the instruction set being executable to characterize the target off-road trail segment comprises the instruction set being executable to characterize topography, terrain, surface conditions, trail grade, and accessibility for the target off-road trail segment.

6. The operating system of claim 5, wherein the instruction set being executable to characterize the target off-road trail segment further comprises the instruction set being executable to characterize topography, terrain, surface conditions, trail grade, and accessibility for the target off-road trail segment based upon information previously communicated from other vehicles that have traversed the target off-road trail segment.

7. The operating system of claim 1, wherein the instruction set being executable to characterize the target off-road trail segment comprises the instruction set being executable to locate communication sites proximal to the target off-road trail segment.

8. The operating system of claim 1, wherein the instruction set being executable to characterize the target off-road trail segment comprises the instruction set being executable to locate electric recharging sites proximal to target off-road trail segment.

9. The operating system of claim 1, wherein the instruction set being executable to characterize the ambient conditions comprises the instruction set being executable to determine present ambient temperature and precipitation associated with the target off-road trail segment.

10. The operating system of claim 1, wherein each of the first plurality of sensors and the third plurality of sensors has an input, and further comprising the instruction set being executable to
estimate the consumption of electric energy for the subject vehicle to operate over the target off-road trail segment by individually passing each input through a convolutional neural network.

11. The operating system of claim 1, wherein the instruction set being executable to characterize the subject vehicle comprises the instruction set being executable to determine a vehicle mass, tire inflation pressures, and presence of a towed vehicle.

12. The operating system of claim 1, further comprising the instruction set being executable to suggest an alternative route based upon the estimated consumption of electric energy for the subject vehicle to avoid occurrence of a low SOC event for the DC power source during operation of the subject vehicle.

13. The operating system of claim 1, further comprising the instruction set being executable to identify and recommend a mid-course exit from the target off-road trail segment to find a charging station based upon the estimated consumption of electric energy for the subject vehicle to avoid occurrence of a low SOC event for the DC power source during operation of the subject vehicle on the target off-road trail segment.

14. The operating system of claim 1, further comprising the instruction set being executable to recommend an alternative travel route based upon the estimated consumption of electric energy for the subject vehicle to avoid occurrence of a low SOC event for the DC power source during operation of the subject vehicle on the target off-road trail segment.

15. A method for controlling operation of a subject vehicle that includes an electric vehicle (EV) drivetrain and a plurality of electrically-powered accessories electrically coupled to a rechargeable DC power source, a navigation system that includes a first plurality of sensors including a global navigation satellite system (GNSS) sensor and an inertial measurement unit (IMU); a second plurality of sensors configured to dynamically monitor ambient environmental conditions for the subject vehicle; and a spatial monitoring system that includes a third plurality of sensors including at least one of a camera, a radar sensor, and a lidar sensor; the method comprising:
determining, via the navigation system, a target off-road trail segment;
determining operational parameters of the EV drivetrain and the plurality of electrically-powered accessories;
characterizing, via the second plurality of sensors and the spatial monitoring system, the ambient environmental conditions for the target off-road trail segment;
characterizing the target off-road trail segment;
characterize, via the IMU, a behavior of the vehicle operator to generate a driving score;
estimating a consumption of electric energy for the subject vehicle to operate over the target off-road trail segment, wherein an estimated consumption of electric energy is determined based upon the operational parameters of the EV drivetrain and the plurality of electrically-powered accessories, the ambient environmental conditions, the target off-road trail segment, and the driving score;
providing to the vehicle operator based on the driving score a recommendation to minimize consumption of electric energy for the subject vehicle; and
controlling the EV drivetrain and the plurality of electrically-powered accessories during operation of the subject vehicle on the target off-road trail segment based upon the estimated consumption of electric energy for the subject vehicle.

16. The method of claim 15, wherein controlling the EV drivetrain comprises controlling electric power consumption of the subject vehicle to avoid a low state of charge (SOC) event for the DC power source during operation of the subject vehicle on the target off-road trail segment.

17. The method of claim 15, wherein the operational parameters of the EV drivetrain include a transmission gear state, a locking differential state and a 2WD/4WD transfer case state; and wherein controlling the EV drivetrain comprises controlling electric power consumption associated with at least one of the transmission gear state, the locking differential state, and the 2WD/4WD transfer case state during operation of the subject vehicle on the target off-road trail segment.

18. The method of claim 15, wherein the operational parameters of the plurality of electrically-powered accessories comprises control parameters for at least one of an electric steering system, a HVAC system, and a stability control system; and controlling electric power consumption of at least one of the electric steering system, the HVAC system, and the stability control system during operation of the subject vehicle on the target off-road trail segment.

19. The method of claim 15, wherein characterizing the target off-road trail segment comprises characterizing topography, terrain, surface conditions, trail grade, and accessibility for the target off-road trail segment.

* * * * *